United States Patent
Chung et al.

(10) Patent No.: US 9,905,092 B2
(45) Date of Patent: Feb. 27, 2018

(54) BIPOLAR LIGHTNING PROTECTION APPARATUS HAVING LIGHT EMITTING UNIT

(71) Applicant: Young-Ki Chung, Seoul (KR)

(72) Inventors: Young-Ki Chung, Seoul (KR); Kang Soo Lee, Goyang-si (KR)

(73) Assignee: Young-Ki Chung, Seoul (KR)

( * ) Notice: Subject to any disclaimer, the term of this patent is extended or adjusted under 35 U.S.C. 154(b) by 0 days.

(21) Appl. No.: 14/858,553

(22) Filed: Sep. 18, 2015

(65) Prior Publication Data
US 2017/0045216 A1    Feb. 16, 2017

(30) Foreign Application Priority Data
Aug. 10, 2015 (KR) .................. 10-2015-0112447

(51) Int. Cl.
G08B 1/00 (2006.01)
G08B 7/06 (2006.01)
H02G 13/00 (2006.01)

(52) U.S. Cl.
CPC ............ G08B 7/06 (2013.01); H02G 13/00 (2013.01); H02G 13/40 (2013.01); H02G 13/80 (2013.01)

(58) Field of Classification Search
CPC ........ H02G 13/00; H02G 13/60; H02G 13/20; H01T 1/15; H01L 27/0255; H01L 21/84; H01L 27/1203; H01L 2924/0002; H01L 21/26586; H01L 21/266; H01L 27/0248; H01L 2924/00; H01L 23/60; H02N 99/00

USPC ..... 340/532, 535, 530, 529, 538.16, 538.17, 340/539.11, 539.22, 545.4, 568.2, 686.1, 340/687
See application file for complete search history.

(56) References Cited

U.S. PATENT DOCUMENTS

| | | | | |
|---|---|---|---|---|
| 2002/0101699 | A1* | 8/2002 | Sakaio ................ | H02G 13/80 361/118 |
| 2004/0105211 | A1* | 6/2004 | Chung ................ | H02G 13/00 361/220 |
| 2004/0133793 | A1* | 7/2004 | Ginter ................ | G06F 21/10 713/193 |
| 2005/0026749 | A1* | 2/2005 | Pak ..................... | A63B 5/20 482/1 |
| 2005/0252061 | A1* | 11/2005 | Sloan ................. | F41A 19/47 42/114 |

(Continued)

OTHER PUBLICATIONS

Derwent 2010-C25638, Feb. 2010, Derwent, Zhou J.*

*Primary Examiner* — Daniel Previl
(74) *Attorney, Agent, or Firm* — Hamre, Schumann, Mueller & Larson, P.C.

(57) ABSTRACT

The present invention relates to a bipolar lightning protection apparatus having a light emitting unit, and in the bipolar lightning protection apparatus configured of a rod member charged with ground charges and a charging plate or a charging tube charged by a thundercloud, the bipolar lightning protection apparatus includes a light emitting unit electrically connected between the rod member and the charging plate or the charging tube and emitting light by electrical energy charged in the charging plate or the charging tube by the thundercloud.

Accordingly, a psychological sense of safety can be given to a user by allowing the user to clearly confirm with naked eyes that a normal operation of safely flowing impulse current of lightning to the earth is performed.

8 Claims, 8 Drawing Sheets

(56) References Cited

U.S. PATENT DOCUMENTS

| | | | | |
|---|---|---|---|---|
| 2011/0102961 A1* | 5/2011 | Lane | ................... | H02N 99/00 |
| | | | | 361/212 |
| 2013/0100710 A1* | 4/2013 | Kang | ................... | H02H 9/04 |
| | | | | 363/21.12 |

* cited by examiner

BIPOLAR LIGHTNING PROTECTION APPARATUS HAVING LIGHT EMITTING UNIT

BACKGROUND OF THE INVENTION

Field of the Invention

The present invention relates to a bipolar lightning protection apparatus having a light emitting unit, and more specifically, to a bipolar lightning protection apparatus having a light emitting unit, which can easily confirm whether or not the lightning protection apparatus operates from outside by receiving power applied from lightning current of lightning and radiating light.

Background of the Related Art

Generally, a lightning protection apparatus is installed at the uppermost part of a building to safely discharge the charges accumulated in a thundercloud to the earth by forming a discharge path between the thundercloud and the earth.

When the thundercloud approaches the earth, the potential difference between the thundercloud and the earth reaches one hundred million volts (V).

However, although a dielectric breakdown, i.e., lightning, does not occur between the earth and the thundercloud since the air in the atmospheric layer functions as an insulator, possibility of occurring lightning between the thundercloud and the earth always exists.

A lightning protection apparatus using an electric field phenomenon (a tip effect) of concentrating electric fields on a sharp pointed head is publicized to prevent damage from lightning, and such a lightning protection apparatus is referred to as a Franklin lightning rod.

Hereinafter, a lightning protection apparatus according to the prior art is described with reference to FIG. 1.

As shown in the figure, a lightning protection apparatus according to the prior art is configured of a fixing unit 31 installed on the top of a building and connected to a grounding means, a rod 30, one end of which is fixed to the fixing unit 31, charged with ground charges, a rod cap 32 coupled to the other end of the rod 30 and inducing lightning, an insulator 34 coupled to the other end unit of the rod 30, and a charging means 45 mounted on the rod 30, and the rod 30 is installed at the center of a charging tube 45a.

The charging means 45 formed in the shape of a tube is configured of the charging tube 45a passing the rod 30 through the center and having tips 45b of a spike shape formed toward the rod 30, and a first cap 45c and a second cap 45d combining both ends of the charging tube 45a with the rod 30, and the second cap 45d is tightly fixed toward the insulator 34 by a stopper 46.

However, although the lightning protection apparatus according to the prior art performs a normal operation of safely flowing impulse current of lightning generated by a thundercloud to the earth, a user may not know clearly whether or not the lightning protection apparatus normally operates.

Accordingly, although a thundercloud approaches in the daytime when the surrounding areas are bright, this cannot be confirmed at all. Particularly, since there is no way to confirm a grounding fault although grounding of the rod to the earth is poor, this can be misunderstood as a normal operation, and thus a fire or damage to a building or loss of lives may occur due to the lightning.

Furthermore, since the lightning protection apparatus is a structure installed at the uppermost part of a building and a worker himself or herself should go up to a narrow work space to inspect operation of the lightning protection apparatus, the work is dangerous and requires an excessive large amount of time.

SUMMARY OF THE INVENTION

Therefore, the present invention has been made in view of the above problems, and it is an object of the present invention to provide a bipolar lightning protection apparatus having a light emitting unit, which can easily confirm whether or not the lightning protection apparatus operates from outside by receiving power applied from lightning current of lightning and radiating light.

To accomplish the above object, according to one aspect of the present invention, there is provided a bipolar lightning protection apparatus having a light emitting unit, the bipolar lightning protection apparatus including a rod member charged with ground charges, a charging plate or a charging tube charged by a thundercloud; and a light emitting unit electrically connected between the rod member and the charging plate or the charging tube and emitting light by electrical energy charged in the charging plate or the charging tube by the thundercloud.

The light emitting unit is configured of a light emitting element for performing a blinking operation while maintaining an electrical contact state with the rod member and the charging plate or the charging tube, a fastening bolt having a coupling/decoupling recess hole formed to fixedly support one end of the light emitting element, and a spring installed inside the coupling/decoupling recess hole to elastically support the light emitting element.

At least one or more light transmitting holes are formed in a circumferential direction of the charging plate or the charging tube so that light radiated from the light emitting element may be radiated to outside.

A light emitting unit connection block of a protruded structure for protecting the light emitting element and the fastening bolt in a state of wrapping is additionally formed in the circumferential direction of the charging plate or the charging tube.

A fastening coupler for accomplishing complementary coupling is formed so that the light emitting unit connection block may be coupled and decoupled to and from the charging plate or the charging tube.

The light transmitting hole is combined with a diffusion lens for tightly sealing to prevent penetration of foreign materials and diffusing the radiated light.

A terminal piece accommodating hole for accommodating a terminal piece formed at one longitudinal end of the light emitting element inside thereof is formed in the circumferential direction of the rod member.

A sound buzzer electrically connected to terminal pieces, which are installed at both longitudinal ends of the light emitting element, and operating in association with operation of the light emitting element is additionally installed in the charging plate or the charging tube.

According to the present invention as described above, since the light emitting unit electrically connected between the rod member and the charging plate or the charging tube and performing a light emitting operation using electrical energy of a thundercloud is configured, a psychological sense of safety can be given to a user by allowing the user to clearly confirm with naked eyes that a normal operation of safely flowing impulse current of lightning to the earth is performed.

In addition, since the light emitting unit connection block of a structure protruding toward outside is configured in the circumferential direction of the charging plate or the charging tube, together with the diffusion lens installed in the light transmitting hole formed in the light emitting unit connection block, a blinking position of the light emitting unit can be further clearly identified, and, in addition, light distribution and brightness of the light emitting element can be further improved.

In addition, since the light emitting element is configured in the charging plate or the charging tube to be electrically connected to the terminal pieces of the light emitting element and operate, the grounding state and normal operation of the lightning protection apparatus can be confirmed clearly.

DESCRIPTION OF SYMBOLS

Figure 1:
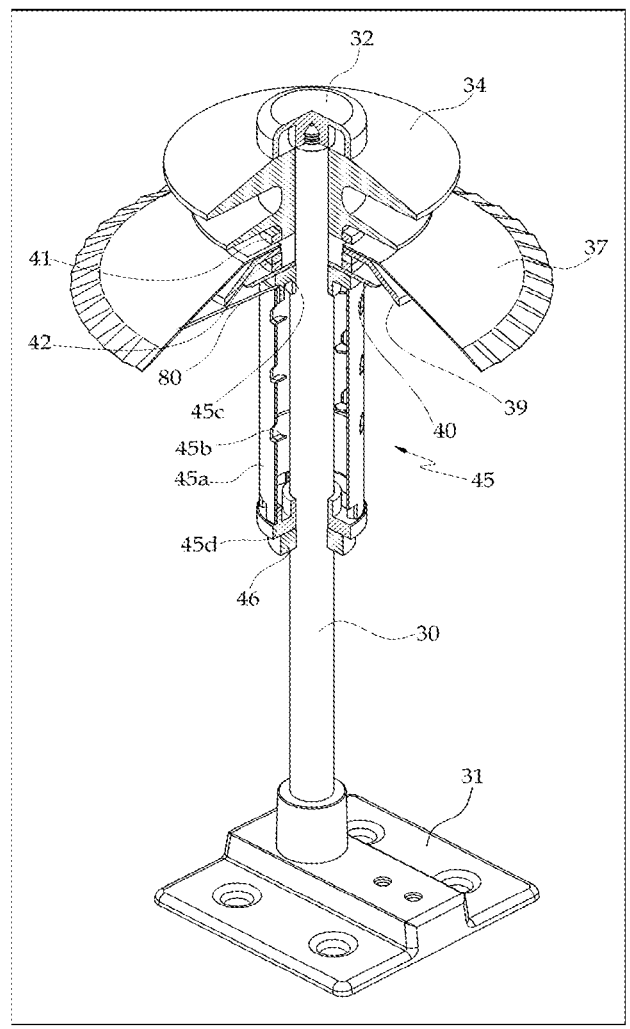
FIG. 1 is a partial cross-sectional perspective view showing the configuration of a lightning protection apparatus according to the prior art.
Figure 2:
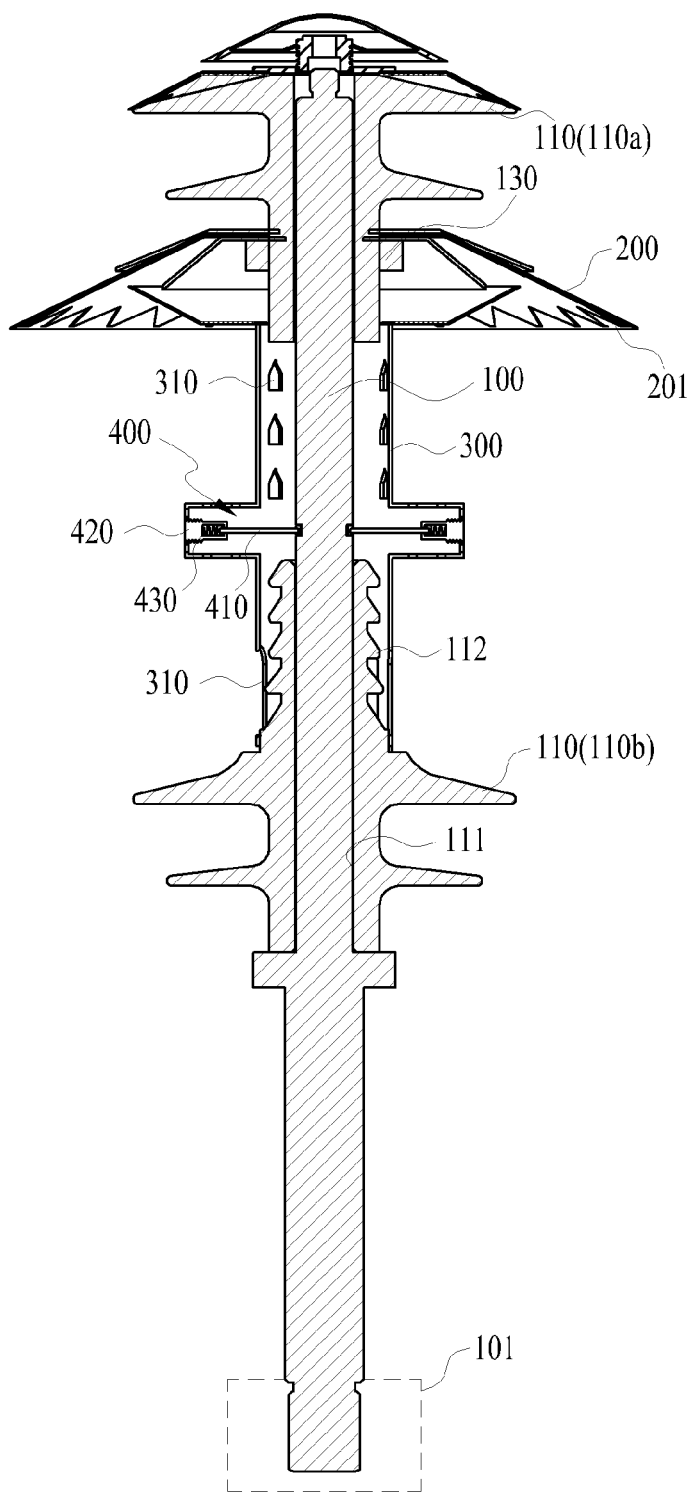
FIG. 2 is a cross-sectional view showing a bipolar lightning protection apparatus having a light emitting unit according to an embodiment of the present invention.

100: Rod member
200: Charging plate
300: Charging tube
320: Light transmitting hole
330: Diffusion lens
350: Light emitting unit connection block
351: Fastening coupler
400: Light emitting unit
410: Light emitting element
420: Fastening bolt
430: Spring
500: Sound buzzer

DETAILED DESCRIPTION OF THE PREFERRED EMBODIMENT

A preferred embodiment of the present invention will be hereafter described in detail, with reference to FIGS. 2 to 8.

A bipolar lightning protection apparatus having a light emitting unit according to present invention is configured to include a rod member 100 charged with ground charges, a charging plate 200 or a charging tube 300 charged by a thundercloud, and a light emitting unit 400 electrically connected between the rod member 100 and the charging plate 200 or the charging tube 300 and emitting light by electrical energy charged in the charging plate 200 or the charging tube 300 by the thundercloud.

First, the rod member 100 is extended at a predetermined length to be vertically erected on the outdoor ground surface and performs a function of charging the ground charges.

In addition, a fixing plate 101 capable of stably fixing the rod member 100 and further improving an area contacting with the earth can be additionally installed at the lower end of the rod member 100.

The fixing plate 101 is a member shaped in a flat panel having a predetermined thickness, and it is natural that a fastener (not shown) is installed on the surface of the fixing plate 101 so that the bipolar lightning protection apparatus can be firmly fixed to the ground surface or a building structure.

In addition, insulators 110 for insulating the charging plate 200 and the charging tube 300, which will be described below, from the rod member 100 are installed at one end and the other end in the longitudinal direction of the rod member 100.

The insulator 110 is an insulating material manufactured using a ceramic or synthetic resin material and is divided into a first insulator 110a installed at an upper portion and a second insulator 110b installed at a lower portion. A penetration hole 111 for passing and combining the rod member 100 is formed in the second insulator 110b, and an insulation projection 112 inserted into the charging tube 300 is formed at the circumscribed radius of the outer surface.

The insulation projection 112 guides flowed-in rainwater to be easily discharged toward outside of the charging tube 300 when the rainwater flows into the charging tube 300 by the influence of wind and has a predetermined length to sufficiently secure an insulation distance between the charging tube 300 and the rod member 100.

To this end, the insulation projection 112 is formed in a structure consecutively connecting a plurality of cone-shaped members, having a narrow top area and a wide bottom area, on the same line.

In addition, the charging plate 200 is installed at a longitudinal upper portion of the rod member 100, and it is installed under the first insulator 110a.

The charging plate 200, which maintains an electrical insulation state with respect to the rod member 100 and is electrically connected to the charging tube 300, is a constitutional element charged with a polarity opposite to that of ground charge.

In addition, the charging plate 200 may repeatedly form wrinkle 201 shapes along the edge of the circumferential direction.

It is since that distributed discharge can be induced uniformly with respect to the circumferential direction of the charging plate 200 by the wrinkles 201.

Such a configuration of the charging plate 200 makes the discharge easy between a thundercloud and the earth since electric fields are concentrated when a flash of lightning flows in.

Meanwhile, the charging tube 300 is positioned in a certain longitudinal section of the rod member 100, i.e., between the first insulator 110a and the second insulator 110b, and electrically connected to the charging plate 200, and this is a configuration in which charges having a polarity opposite to that of the ground charge are charged.

Such a charging tube 300 is formed in the shape of a tube, and a hollow is formed to combine the rod member 100 at the center of the charging tube.

In addition, a supporting body 130 for supporting the charging tube 300 and the first insulator 110a is installed in the rod member 100.

In addition, a plurality of penetration holes 310 having a predetermined size is formed at the circumferential upper and lower portions of the charging tube 300.

Meanwhile, the light emitting unit 400 is electrically connected between the rod member 100 and the charging plate 200 or the charging tube 300 and embodies a light emitting operation by electric energy charged in the charging plate 200 or the charging tube 300 by a thundercloud.

Such a light emitting unit 400 embodies a light emitting operation through corona discharge according to approach of the thundercloud. That is, since the light emitting unit 400 performs the light emitting operation in advance before impulse current of lightning is generated, it may give a psychological sense of safety to a user by allowing the user to clearly confirm with naked eyes that a normal operation of safely flowing the impulse current of lightning to the earth is performed through the lightning protection apparatus, and, on the contrary, if the light emitting unit 400 is not lit although the thundercloud approaches, it is understood that a grounding fault occurs between the rod member 100 and the earth, and thus a fire or damage to a building or loss of lives caused by the lightning can prevented by performing a prompt action according thereto, and, in addition, inconvenience of a worker regularly performing an inspection work of going up to a narrow installation place and confirming normal operation although the lightning protection apparatus normally operates can be relieved.

Specifically, the light emitting unit 400 is configured of a light emitting element 410 for performing a blinking operation while maintaining an electrical contact state with the rod member 100 and the charging plate 200 or the charging tube 300, a fastening bolt 420 having a coupling/decoupling recess hole 421 formed to fixedly support one end of the light emitting element 410, and a spring 430 installed inside the coupling/decoupling recess hole 421 to elastically support the light emitting element 410.

A discharging tube (also referred to as an 'arc tube') used in a mercury lamp, a metal halide lamp or the like is preferably used as the light emitting element 410, and an LED element added with a voltage regulator circuit publicized in this field can be manufactured and used as the light emitting element 410.

Apparently, it is natural that terminal pieces 411a and 411b for electrical communication are formed at both ends of the light emitting element 410.

The terminal piece 411a installed at one side end of the light emitting element 410 contacts with the rod member 100 and the terminal piece 411b installed at the other side end contacts with the charging plate 200 or the charging tube 300 to maintain an electrical connection state.

The fastening bolt 420 is screw-combined while penetrating the charging plate 200 or the charging tube 300, in which a fastening screw unit 422 is formed in the outer circumferential direction, and the coupling/decoupling recess hole 421 for fixedly supporting one end of the light emitting element 410 is formed at one side end.

A fastening step 421a for latching the terminal piece 411b of the light emitting element 410 is formed on the open surface of the coupling/decoupling recess hole 421.

Such a fastening bolt 420 is manufactured using a metallic material for the purpose of electrical communication.

The spring 430 is installed inside the coupling/decoupling recess hole 421 to perform a function of elastically supporting the light emitting element 410 combined with the coupling/decoupling recess hole 421.

That is, the spring 430 provides a function of safely protecting the light emitting element 410 so as not to be easily broken when a shock is applied from outside and a function of stabilizing the electrical connection.

Figure 3:
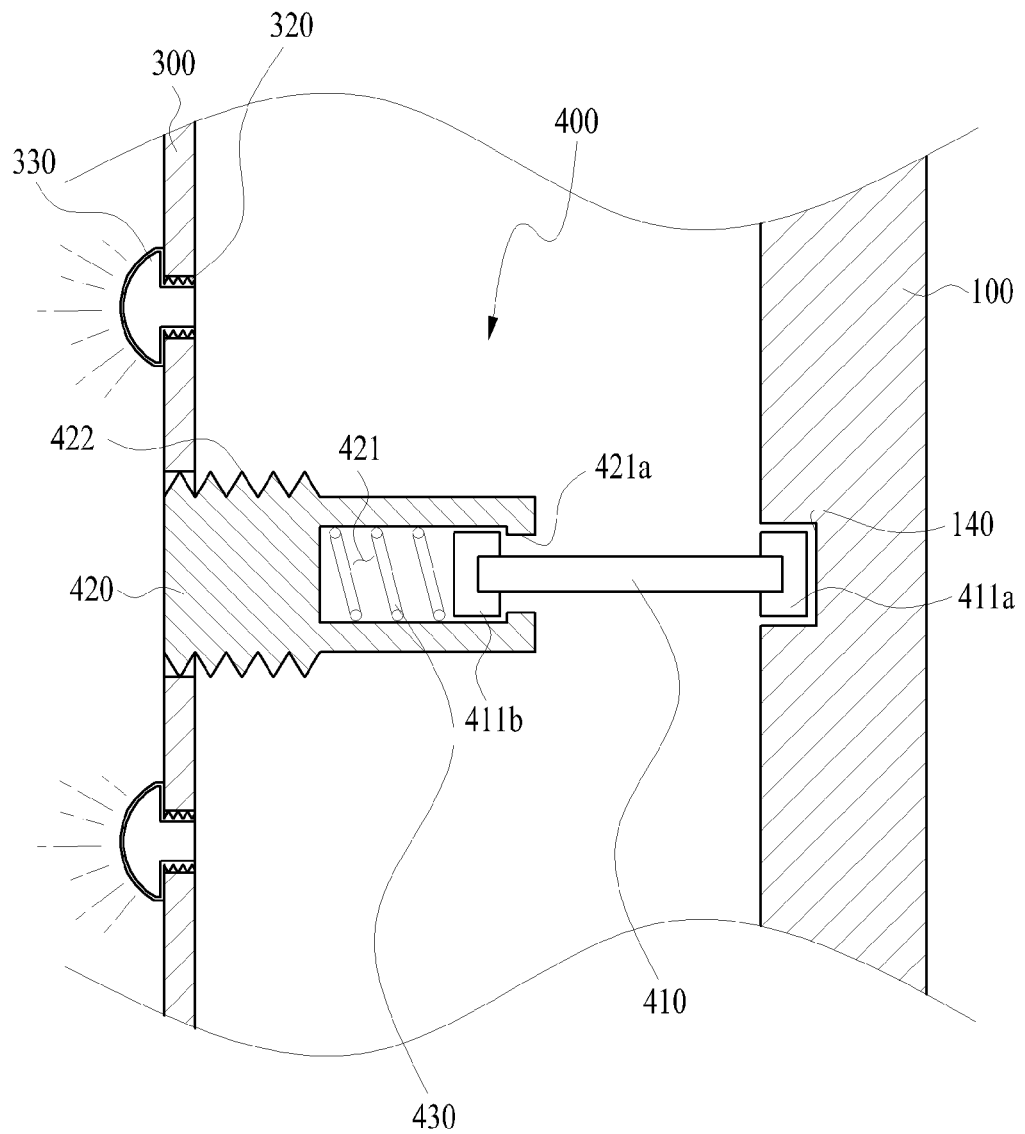
FIG. 3 is an enlarged view showing the configuration of the light emitting unit of FIG. 2.

In addition, at least one or more light transmitting holes 320 are formed in the circumferential direction of the charging plate 200 or the charging tube 300 so that the light radiated from the light emitting element 410 may be radiated to outside (see FIG. 3).

In addition, the light transmitting hole 320 is tightly sealed with a synthetic resin material or the like to prevent penetration of foreign materials and transmit light, or a diffusion lens 330 configured of a glass material, a synthetic resin material or the like for diffusing light can be combined with the light transmitting hole 320.

Apparently, the diffusion lens 330 performs a function of diffusing the light radiated from the light emitting element 410.

In addition, a terminal piece accommodating hole 140 for accommodating the terminal piece 411a of the light emitting element 410 inside thereof is formed in the circumferential direction of the rod member 100.

This is to support the terminal piece 411a to maintain a stable contact state without moving by configuring the terminal piece accommodating hole 140.

Apparently, the terminal piece 411a of the light emitting element 410 can be installed in a structure directly contacting a surface with the outer peripheral surface of the rod member 100.

Figure 4:
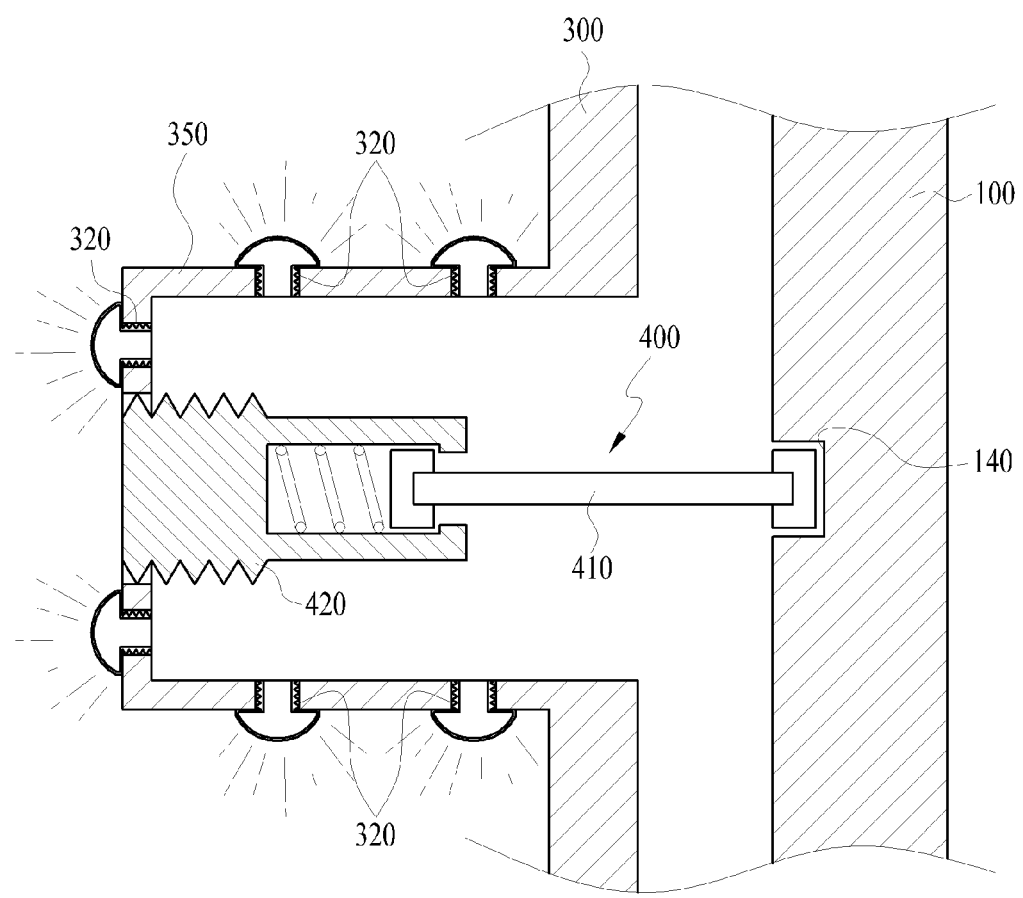
FIG. 4 is an enlarged view showing a light emitting unit connection block according to a preferred embodiment of the present invention.

In addition, a light emitting unit connection block 350 of a protruded structure for protecting the light emitting element 410 and the fastening bolt 420 in a state of wrapping is additionally formed in the circumferential direction of the charging plate 200 or the charging tube 300 (see FIG. 4).

The light emitting unit connection block 350 is preferably installed in plurality along the circumferential direction of the charging plate 200 or the charging tube 300 to be spaced from each other by a predetermined distance.

Since such a light emitting unit connection block 350 may further clearly identify a position where the light emitting unit 400 is installed and, in addition, form the light transmitting hole 320 at a variety of angles by the protruded external structure, light distribution and brightness of the light emitting element 410 can be further improved.

Figure 5:
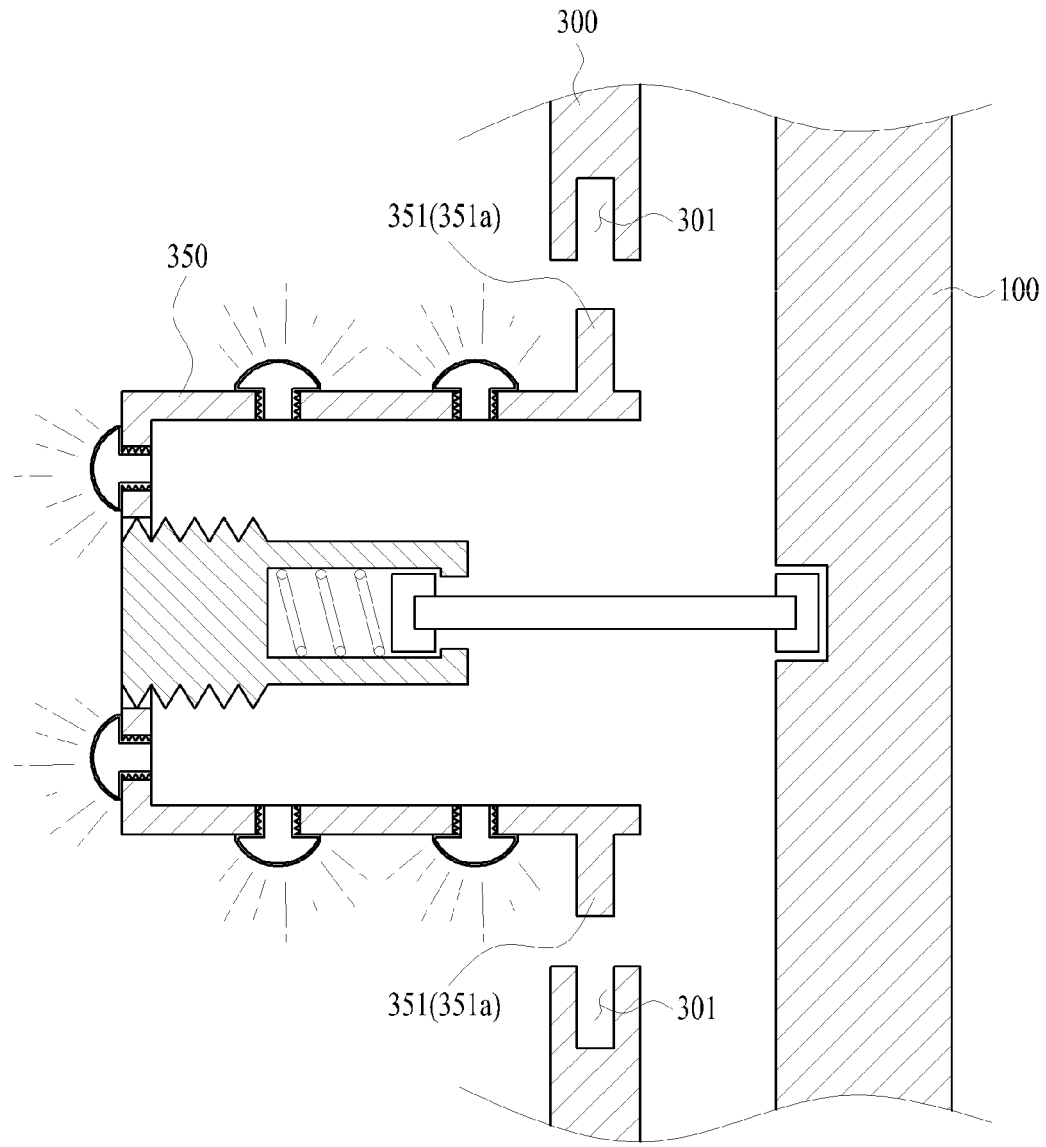
FIG. 5 is an enlarged view showing another embodiment of the light emitting unit connection block of FIG. 4.
Figure 6:
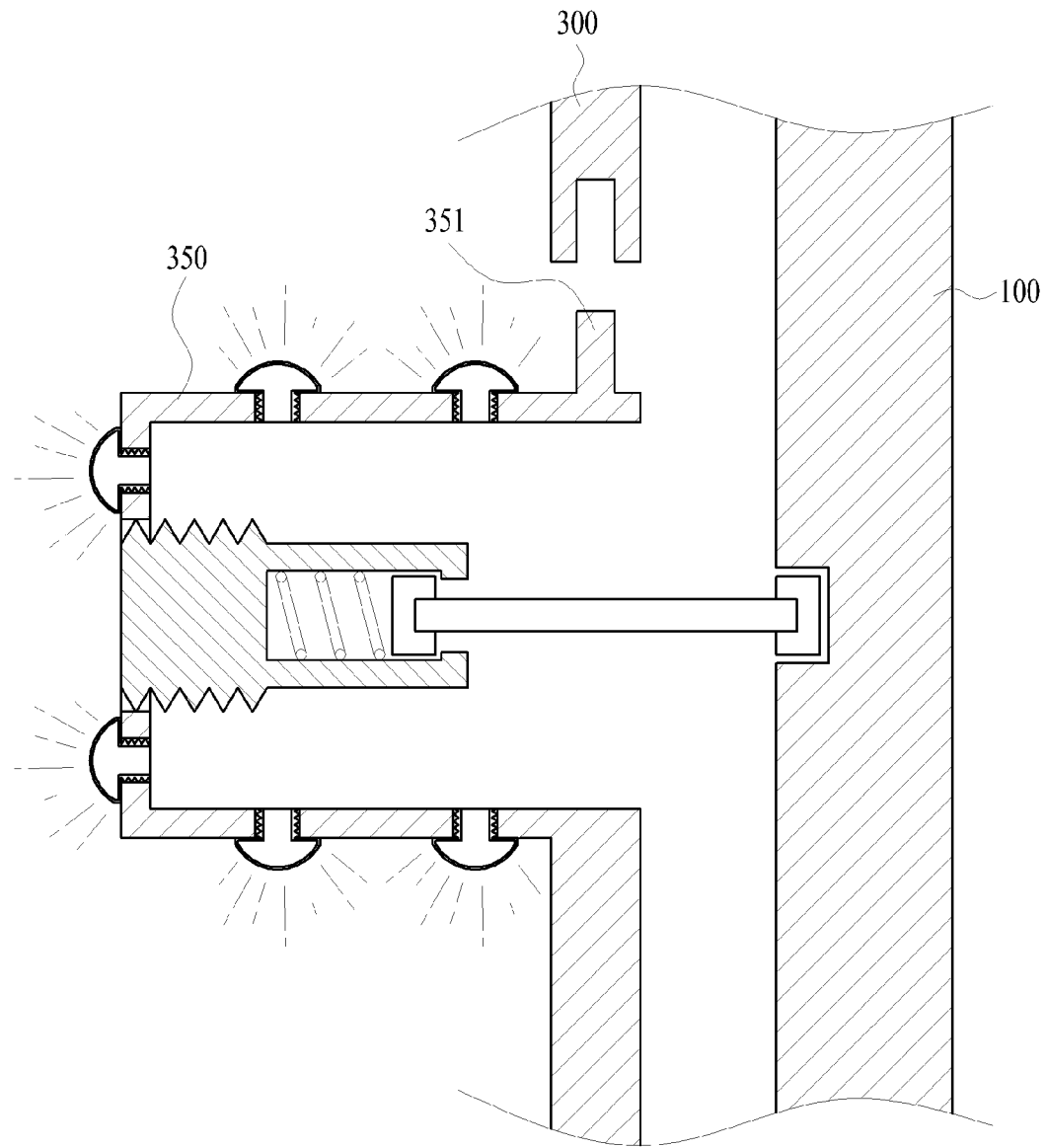
FIG. 6 is an enlarged view showing another embodiment of the light emitting unit connection block of FIG. 4.

In addition, FIGS. 5 and 6 are views respectively showing another embodiment of the light emitting unit connection block 350, and, here, a fastening coupler 351 for accomplishing complementary coupling is formed so that the light emitting unit connection block 350 may be coupled and decoupled to and from the charging plate 200 or the charging tube 300.

That is, as shown in FIG. 5, the light emitting unit connection block 350 is configured of a first fastening coupler 351a and a second fastening coupler 351b so that the charging plate 200 or the charging tube 300 may be combined in the vertical direction with the intervention of the light emitting unit connection block 350, and coupling holes 301 coupled in correspondence to the first fastening coupler 351a and the second fastening coupler 351b are respectively formed in the charging plate 200 or the charging tube 300.

In addition, as shown in FIG. 6, in the light emitting unit connection block 350, a protruded portion is connected to the charging plate 200 or the charging tube 300 in an integrated structure, and a fastening coupler 351 for accomplishing coupling and decoupling with respect to the charging plate 200 or the charging tube 300 is formed at the other protruded portion.

Figure 7:
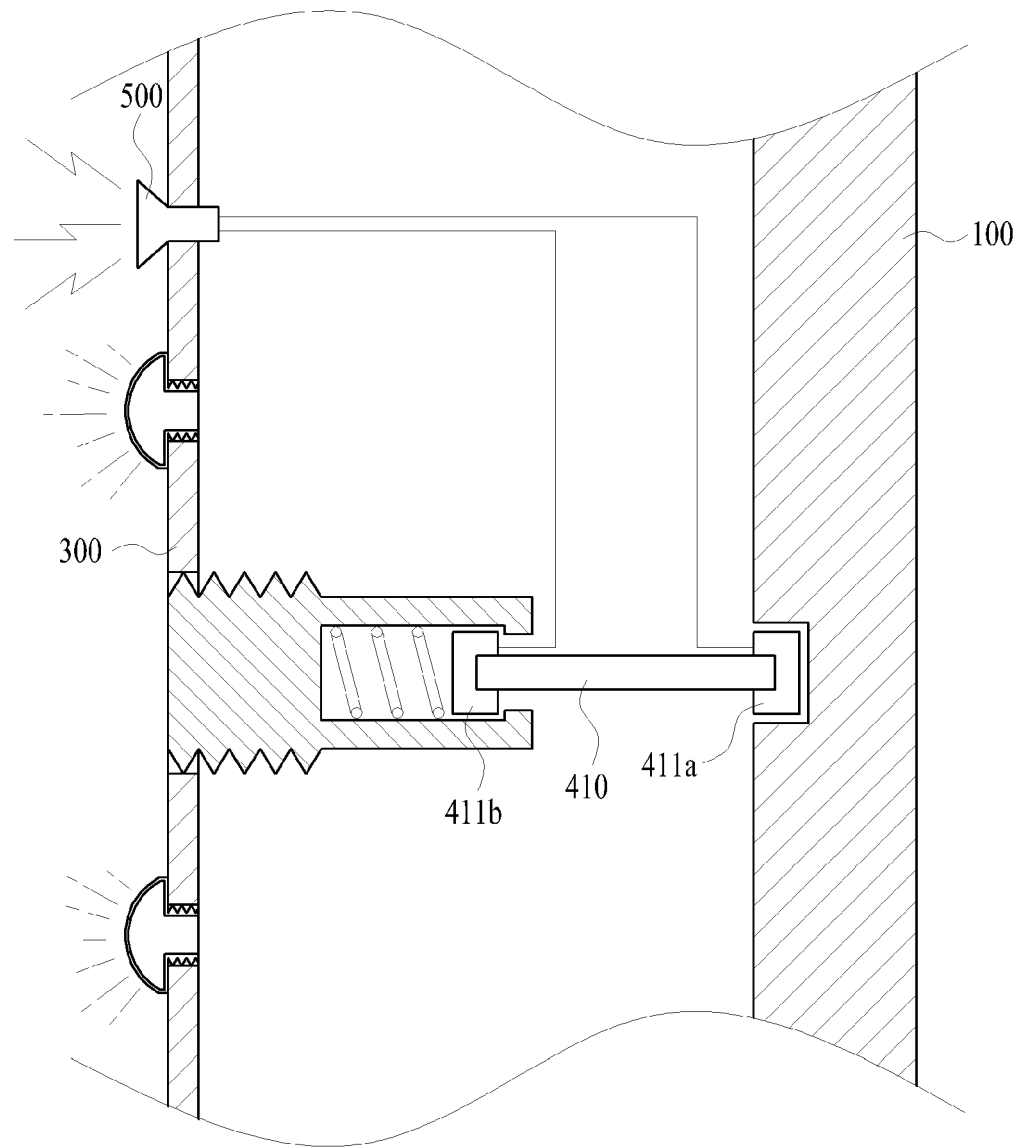
FIG. 7 is an enlarged view showing the configuration in which a sound buzzer is installed in the charging tube of FIG. 2.

Meanwhile, as shown in FIG. 7, a sound buzzer 500 electrically connected to the terminal pieces 411a and 411b, which are installed at both longitudinal ends of the light emitting element 410, and operating in association with the operation of the light emitting element 410 is additionally installed in the charging plate 200 or the charging tube 300.

That is, the sound buzzer 500 is to allow a user to acoustically confirm an operation state, in addition to visually confirming the operation state through the light emitting unit 400.

In other words, the sound buzzer 500 is turned on if the light emitting element 410 is turned on and turned off if the light emitting element 410 is turned off.

Since the sound buzzer 500 operated by a voltage applied to both ends of the light emitting element 410 uses a publicized circuit which converts electrical signals into a sound when power is applied, such as a piezo buzzer, a speaker or the like, descriptions thereof will be omitted.

Figure 8:
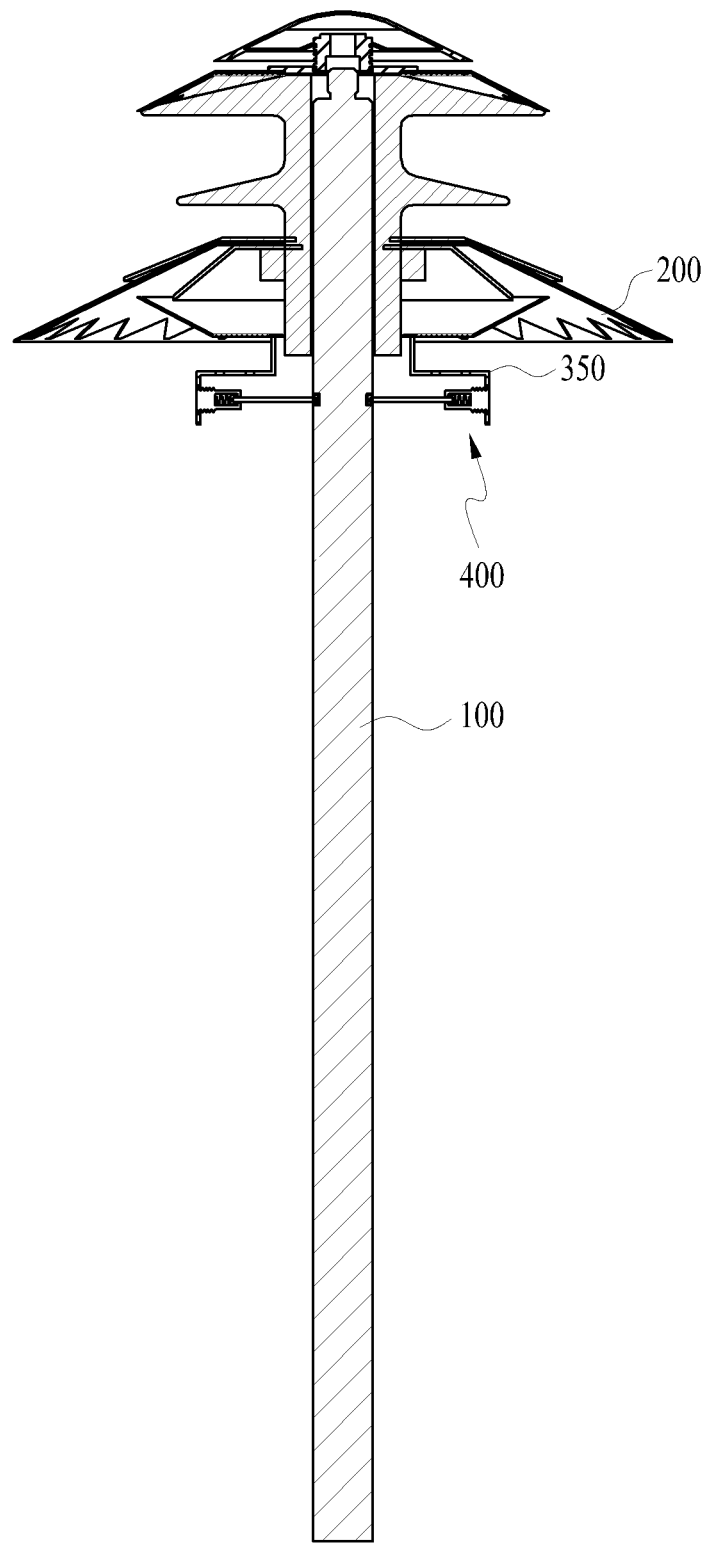
FIG. 8 is a cross-sectional view showing a structure in which a light emitting unit according to an embodiment of the present invention is installed in a charging plate.

Meanwhile, FIG. 8 is a cross-sectional view showing a structure in which a light emitting unit 400 according to an embodiment of the present invention is electrically connected to the charging plate 200.

That is, the light emitting unit 400 is electrically connected between the rod member 100 and the charging plate 200. At this point, the light emitting unit connection block 350 is applied as a medium for electrically connecting the rod member 100 and the charging plate 200.

Here, the light emitting unit connection block 350 is preferably manufactured in a structure having an open bottom.

According to the present invention as described above, since the light emitting unit 400 electrically connected between the rod member 100 and the charging plate 200 or the charging tube 300 and performing a light emitting operation using electrical energy of a thundercloud is configured, a psychological sense of safety can be given to a user by allowing the user to clearly confirm with naked eyes that a normal operation of safely flowing impulse current of lightning to the earth is performed.

Furthermore, since the light emitting unit connection block 350 of a structure protruding toward outside is configured in the circumferential direction of the charging plate 200 or the charging tube 300, together with the diffusion lens 330 installed in the light transmitting hole 320 formed in the light emitting unit connection block 350, a blinking position of the light emitting unit 400 can be further clearly identified, and, in addition, light distribution and brightness of the light emitting element 410 can be further improved.

Furthermore, since the light emitting element 410 to be electrically connected to the terminal pieces 411a and 411b is configured in the charging plate 200 or the charging tube 300 and operate, the grounding state and normal operation of the lightning protection apparatus can be confirmed clearly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A bipolar lightning protection apparatus comprising:
   a rod member charged with ground charges;
   a charging plate and a charging tube charged by a thundercloud; and
   a light emitting unit electrically connected between the rod member and the charging tube and emitting light by electrical energy charged in the charging plate and the charging tube by the thundercloud,
   wherein the charging tube has a tube shape, the rod member being disposed at a center of the tube shape, and the rod member being electrically connected to the charging plate,
   wherein the rod member is insulated from the charging plate and the charging tube, and
   the light emitting unit maintains an electrical contact state with the rod member and the charging tube.

2. The bipolar lightning protection apparatus according to claim 1, wherein the light emitting unit is configured of
   a light emitting element for performing a blinking operation while maintaining an electrical contact state with the rod member and the charging plate or the charging tube,
   a fastening bolt having a coupling/decoupling recess hole formed to fixedly support one end of the light emitting element, and
   a spring installed inside the coupling/decoupling recess hole to elastically support the light emitting element.

3. The bipolar lightning protection apparatus according to claim 2, wherein at least one or more light transmitting holes are formed in a circumferential direction of the charging plate or the charging tube so that light radiated from the light emitting element may be radiated to outside.

4. The bipolar lightning protection apparatus according to claim 3, wherein a light emitting unit connection block of a protruded structure for protecting the light emitting element and the fastening bolt in a state of wrapping is additionally formed in the circumferential direction of the charging plate or the charging tube.

5. The bipolar lightning protection apparatus according to claim 4, wherein a fastening coupler for accomplishing complementary coupling is formed so that the light emitting unit connection block may be coupled and decoupled to and from the charging plate or the charging tube.

6. The bipolar lightning protection apparatus according to claim 4, wherein the light transmitting hole is combined with a diffusion lens for tightly sealing to prevent penetration of foreign materials and diffusing the radiated light.

7. The bipolar lightning protection apparatus according to claim 2, wherein a terminal piece accommodating hole for accommodating a terminal piece formed at one longitudinal end of the light emitting element inside thereof is formed in the circumferential direction of the rod member.

8. The bipolar lightning protection apparatus according to claim 2, wherein a sound buzzer electrically connected to terminal pieces, which are installed at both longitudinal ends of the light emitting element, and operating in association with operation of the light emitting element is additionally installed in the charging plate or the charging tube.

* * * * *